March 31, 1925.
W. H. MEYER
1,531,620
PENETROMETER FOR X RAYS
Filed June 5, 1922
3 Sheets-Sheet 1
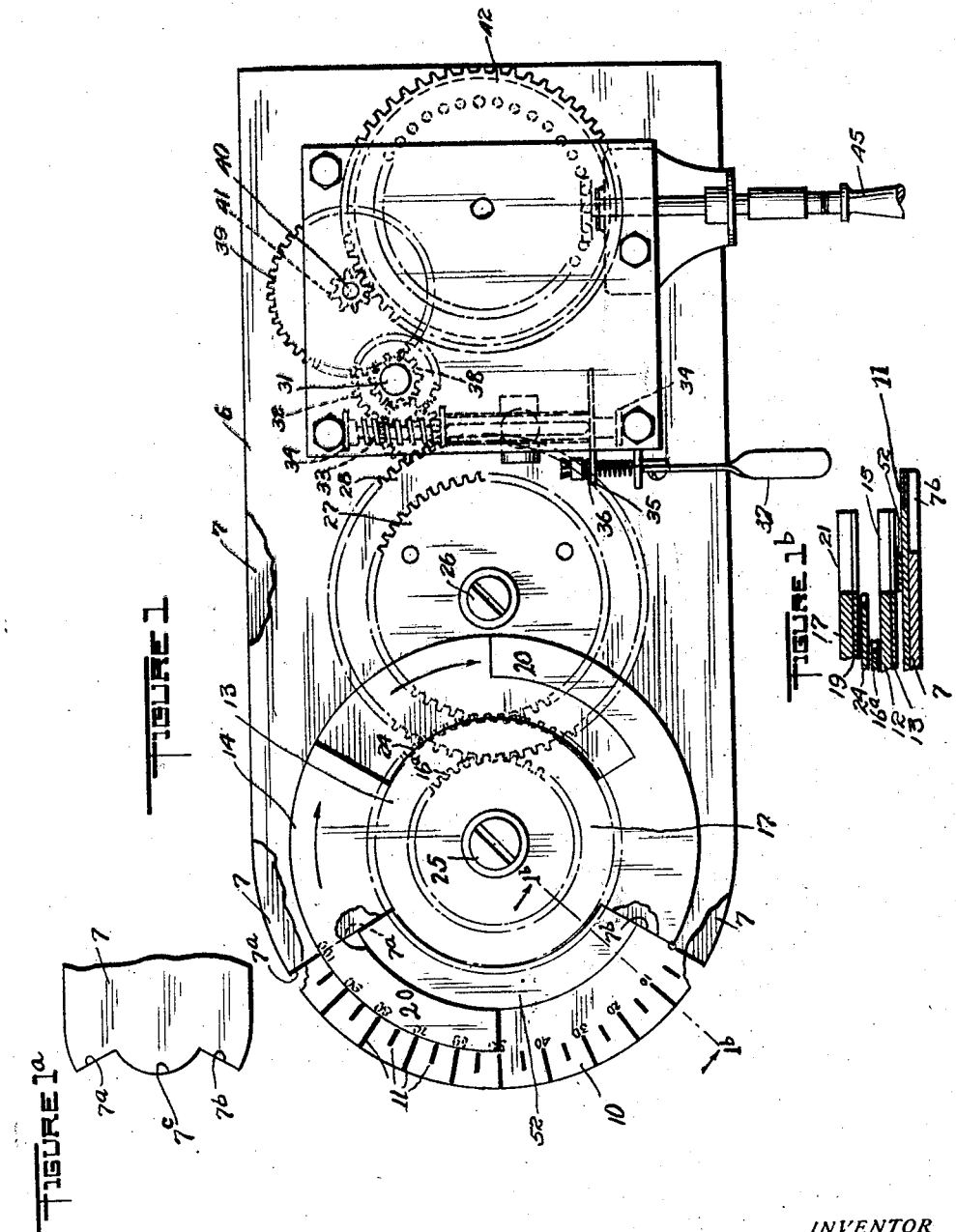
INVENTOR
William H. Meyer
BY Walton Harrison
ATTORNEY
WITNESS
M. E. Lessin March 31, 1925. 1,531,620
W. H. MEYER
PENETROMETER FOR X RAYS
Filed June 5, 1922 3 Sheets-Sheet 2
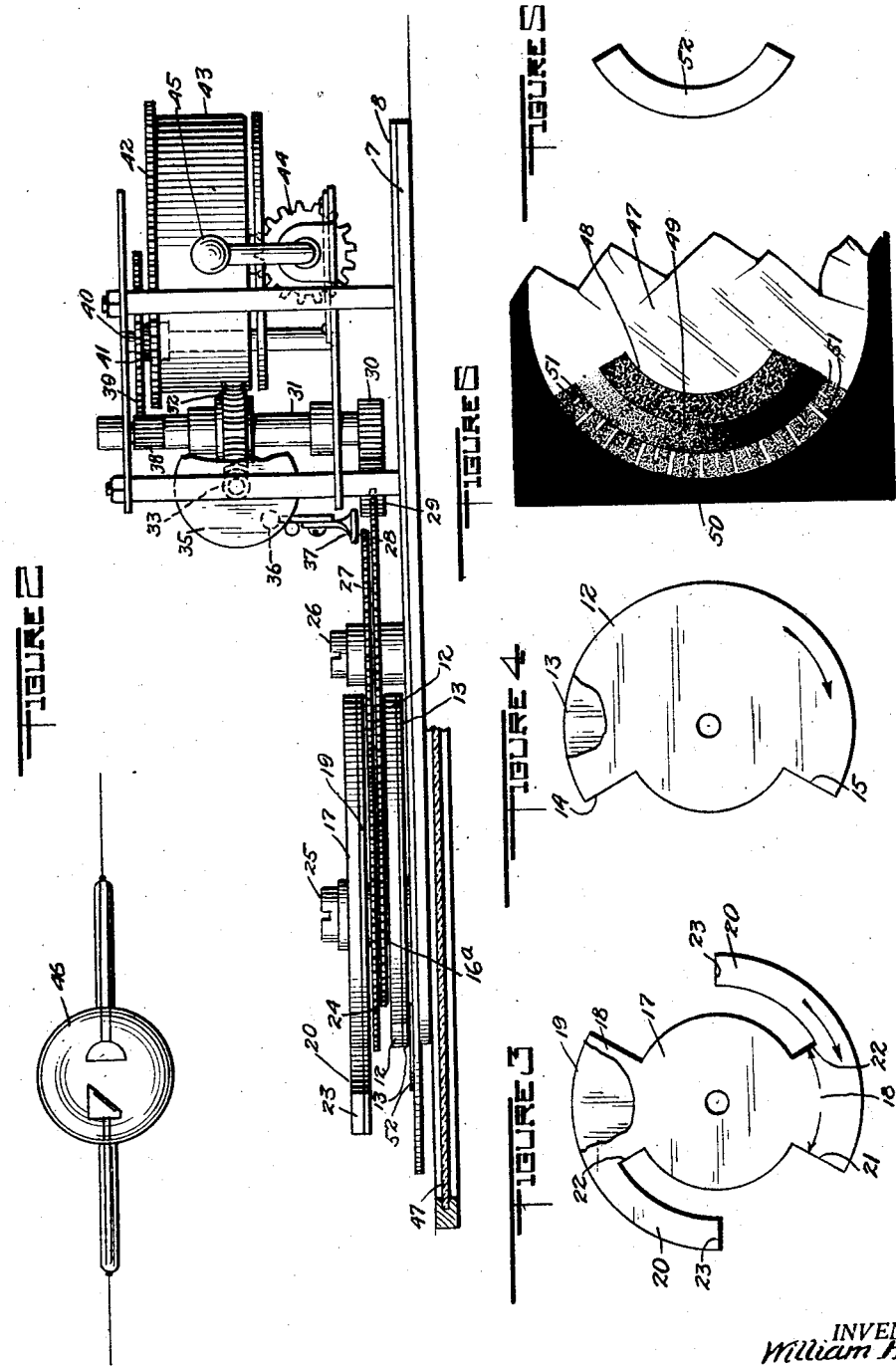
INVENTOR
William H. Meyer
BY Walton Harrison,
ATTORNEY March 31, 1925.
W. H. MEYER
1,531,620
PENETROMETER FOR X RAYS
Filed June 5, 1922       3 Sheets-Sheet 3
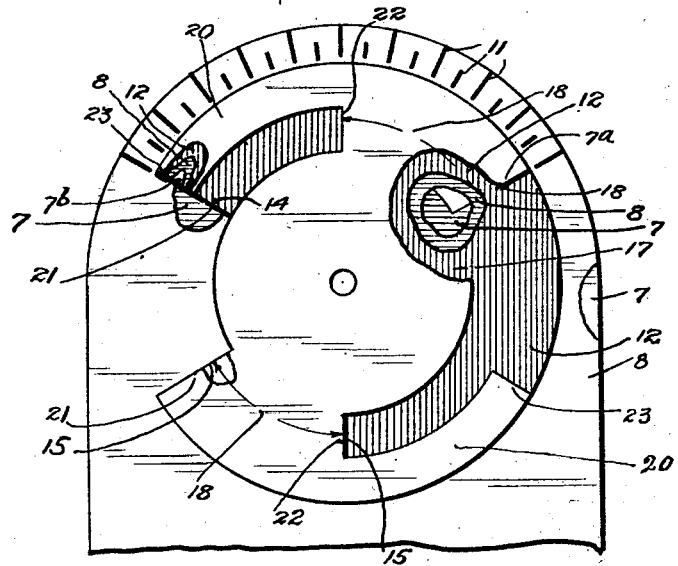

Patented Mar. 31, 1925.

1,531,620

UNITED STATES PATENT OFFICE.

WILLIAM H. MEYER, OF TUCKAHOE, NEW YORK.

PENETROMETER FOR X RAYS.

Application filed June 5, 1922. Serial No. 565,878.

*To all whom it may concern:*

Be it known that I, WILLIAM H. MEYER, a citizen of the United States, residing in Tuckahoe, in the county of Westchester and State of New York, have invented certain new and useful Improvements in Penetrometers for X Rays, of which the following is a full, clear, and concise description.

My invention relates to penetrometers for X-rays; that is, to devices for measuring the percentage of transmission and absorption of X-rays passing through a given medium; from which data it is possible to calculate a suitable depth dose of X-rays, and to determine the degree of homogeneity thereof.

For the purpose of testing the quality of X-rays as to their penetrative power, and by comparison, of determining the quantity of X-rays delivered to any particular deep-seated anatomical part, in terms of the incident or surface dose of the X-rays, it has heretofore been necessary to resort to methods of measurement which were either inaccurate or uncertain, or else were difficult to practice. Moreover, the methods heretofore used required expensive apparatus and consumed much time.

With my device I seek to eliminate most of the undesirable features of older methods, the net result being that my device gives results much more accurate and dependable. Besides this, in using my mechanism not much time is required to make the necessary readings and the determinations dependent upon the direct readings.

Reference is made to the accompanying drawing forming a part of this specification, and in which like reference characters indicate like parts throughout the several figures.

Figure 1 is a plan view of my improved penetrometer, certain portions being broken away.

Figure 1$^a$ is a fragmentary plan view of the leaden base with which my device is provided.

Figure 1$^b$ is a section on the line 1$^b$—1$^b$ of Figure 1, looking in the direction indicated by the arrows.

Figure 2 is a side elevation of the device, showing it in use in connection with an X-ray tube.

Figure 3 is a plan view of one of the rotary shutters forming a part of my device, the shutter being shown as partly broken away.

Figure 4 is a plan view of another shutter forming a part of my device, and here shown as partly broken away.

Figure 5 is a plan view of a sector used in connection with my device, and the absorption of which may be used as a standard of comparison.

Figure 6 is a fragmentary plan view of a photographic plate which has been exposed in connection with the use of my device, and afterwards developed.

Figures 7, 8 and 9 are diagrams, illustrating the manner in which the exposure of the photographic plate is controlled by movements of the revoluble shutters.

A base 7, made of lead and having the form of a plate, is provided at one of its ends with two straight edges 7$^a$ and 7$^b$, inclined toward each other, and is further provided intermediate of these edges with a curved edge 7$^c$, as shown more particularly in Figure 1$^a$.

Mounted rigidly upon the base 7 is a thin face plate 8, made of steel or aluminum. The face plate 8 is provided with a rather narrow arcuate portion 10, upon which are graduations 11. These graduations are in this instance merely lead inlays, as indicated at the right hand side of Figure 1$^b$, each having the form of a short straight mark, the entire group of marks being arranged in a row of substantially arcuate form and accompanied by numerals running from 0 to 100, as shown at the left hand portion of Figure 1.

A revoluble shutter 12 is made of lead, and has the form indicated in Figure 4. This shutter is provided with a backing 13, consisting of sheet steel, and is provided with a pair of straight edges, 14 and 15, inclined radially as shown. The shutter 12 is connected with a gear wheel 16$^a$ whereby it is turned.

Another revoluble shutter is shown at 17, and has the form indicated in Figure 3. This shutter is provided with a pair of oppositely-disposed portions 18, each having the form of a sector. The shutter is made of lead, and is provided with a backing 19 of steel or aluminum. Each sector 18 carries a tongue 20 of arcuate form and is provided with straight edges 21 and 22. Each tongue 20 is provided at its free end with a straight edge 23.

Disposed adjacent the gear wheel 16 is a somewhat larger gear wheel 24, these two gear wheels being loose relatively to each other and being mounted to turn freely upon a pivot pin 25.

Another pivot pin 26 carries a pair of gear wheels 27 and 28, secured together and revoluble as a unit. Engaging the gear wheel 28 is a pinion 29, and engaging this pinion is another pinion 30, carried by a revoluble shaft 31. This shaft carries a worm wheel 32, which engages a worm 33, the latter being journaled in bearings 34. Connected with the worm 33 is a brake disc 35. Disposed adjacent this brake disc is a brake shoe 36, mounted upon a brake lever 37, operable by hand.

The operator, by actuating the brake lever 37 so as to control the pressure of the brake shoe 36 against the brake disc 35, can control the speed of the gearing and parts actuated thereby, and can also throw these parts into and out of action.

Mounted rigidly upon the revoluble shaft 31 is a pinion 38, and engaging this pinion is a gear wheel 39 mounted rigidly upon a revoluble shaft 40. This shaft also carries a pinion 41, mounted rigidly upon it. Engaging the pinion 41 is a gear wheel 42, the latter being mounted upon a spring barrel 43.

A winding mechanism is shown at 44 and is connected with this spring barrel. The winding mechanism is provided with a handle 45, by which it is wound up.

An X-ray tube is shown at 46, and is located directly over one end of my apparatus, as may be understood from Figure 2.

A photographic plate, properly sensitized, is fragmentarily shown at 47. At 48 and 49 in Figure 5, appear two fields of exposure of the photographic plate. Each of these fields is of arcuate form, as shown more particularly in Figure 6. The manner in which these fields of exposure are produced is hereinafter described more completely in detail, and further particulars are given as to the pecularities of the two fields respectively.

At 50 is a third field of exposure, and in practice it has the appearance of a partially-shaded area of arcuate form, and displaying marks 51 corresponding with the marks 11 shown at the left of Figure 1. The marks 11, being merely lead inlays as indicated at the right hand side of Figure 1$^b$ as above described, serve to obstruct the passage of the X-rays to some extent, and thus cause the photographic plate, when developed, to appear as indicated at 51 in Figure 6.

A member 52, having in this instance a substantially arcuate form and made preferably of aluminum, is used for absorbing a portion of the X-rays that would otherwise fall upon the field of exposure 48. The purpose of this member 52 is hereinafter more completely described.

The arrangement of the gearing is such that the two shutters 12 and 17 are driven at unequal speeds, the number of rotations of the shutter 12 being exactly double that of the shutter 17. The shutters and other parts associated therewith are so arranged, relatively to each other and to the gearing, that whenever the edge 14 of the shutter 12 (see Figure 4) is brought into exact registry with the edge 7$^b$ (see Figure 1$^a$) of the lead base 7, the end 23 of the tongue 20 carried by the shutter 17 is also brought into exact registry with this same edge 7$^b$, as may be understood from Figure 7. The various parts are also further arranged so that each time the edge 15 of the shutter 12 is in exact registry with the edge 7$^a$ of the plate 7 (see Figure 1$^a$), the end 23 of the tongue 20 is always midway between the edges 7$^b$ and 7$^a$ of the lead base 7, as may be understood from Figure 8.

With the parts proportioned and arranged as thus described, it follows that when the edge 15 of the sector 12 reaches the position indicated for it in Figure 9, the end 23 of tongue 20, carried by the sector 17, is midway between the edge 15 of the sector 12 and the edge 7$^a$ of the lead plate 7; and from this fact it is obvious that the end 23, carried by the shutter 17, and the edge 15, carried by the shutter 12, must reach the edge 7$^a$ at the same instant.

The net result is that the field of exposure 48 is simply covered and uncovered by the rotation of the shutter 12 acting alone—the effect being exactly the same as if the shutter 17 was missing altogether. Hence the density of the X-rays reaching the field of exposure 48 is uniform from one end of this field to the other as indicated by the uniformity of the shading for this field of exposure in Figure 6.

The conditions, however, are different for the field of exposure 49, as will now be explained. Starting with the two shutters 12 and 17 in the relative positions indicated for them in Figure 7, it will be noted that the edge 14 of the shutter 12 is moving more rapidly than the end 23 carried by the shutter 17, but that neither the edge 14 nor any other portion of the shutter 12 now has for the moment any effect whatever upon the sensitive plate at any point which is being passed over by the tongue 20. In other words, the tongue 20 is now acting alone in uncovering the field of exposure 49 shown in Figure 6, and this movement continues until the two shutters reach the respective positions indicated for them in Figure 8. The movement being continued, however, the edge 15 of the shutter 12 next advances out over the edge 7ᵇ of the lead base 12, and follows the end 23 of the tongue 20 carried by the disc 17, gaining rapidly upon the same as indicated in Figure 9, so as to reach the edge 7ᵃ of the base 7 at the instant the end 23 reaches that edge. By studying quite carefully the shutter movement just described it will be seen that in consequence thereof, the time exposure is unequal upon various portions of the area thus uncovered by the tongue 20 and immediately afterwards covered by the shutter 12. The result is that the field of exposure 49 is acted upon by the X-rays to a much greater extent at one end of the field of exposure than at the other end thereof, as may be understood from Figure 6.

We have, in the photographic plate, first, the uniformly illuminated field of exposure 48, and second, the field of exposure 49 in which the degree of exposure at one of its ends is zero and, at the other of its ends is equal to that of the uniformly illuminated field of exposure 48.

By means of the graduations represented by the marks 51, collectively constituting a scale which may be assumed to be divided into one hundred equal parts, it is practicable to indicate, along the field of exposure 49, definite places where the percentage of time of exposure is expressed in percentage of the total time of exposure of the uniformly illuminated field 48.

Suppose, next, that the arcuate member 52 of aluminum, shown more particularly in Figure 5, be laid upon the face plate 8, in the position indicated for it in Figures 1 and 2, and that the other operations above described now be performed. The aluminum sector 52, being of known thickness and purity, of course absorbs a certain percentage of the X-rays passing through it. Since the aluminum sector 52 covers the portion of the sensitive photographic plate 47 represented by the field of exposure 48, the exposure of the sector 52 to the X-rays is uniform from one end of this sector to the other. Hence, the degree of absorption of the X-rays by the aluminum sector is uniform from one end of the sector to the other. It follows that owing to the absorption of a portion of the X-rays by the aluminum sector 52, the field of exposure 48 is protected to some extent from the action of the X-rays; so that, although the degree of illumination of the field of exposure 48 still remains uniform from one end of this field to the other, the mean density of the X-rays now reaching this field is less than before, to an extent commensurate with the loss from absorption. Thus the field of illumination 48, owing to the absorptive action of the aluminum sector 52, is now subjected to X-rays the density of which is uniform throughout the area, and which is less than the mean density of the X-rays reaching one end of the illuminated field 49, yet greater than the mean density of the X-rays reaching the other end of said last mentioned field. It follows that, on the photographic plate when developed, the field of illumination 48 will exhibit a tint in which the shading is uniform from one end of the field to the other, and the field of illumination 49 will exhibit a tint in which the shading varies from zero at one end of the field to a maximum at the other end thereof; and also that at some point which can be defined by aid of the scale, the tints of the two fields of exposure 48 and 49 will match. The operator, by locating the point at which the two tints match exactly, can read off from the scale the percentage portion of the radiation which has been transmitted or absorbed by the aluminum sector 52.

If, now, the thickness of the aluminum sector be known, it is an easy matter to calculate the percentage of absorption for an aluminum sector of any other thickness. Stating the same fact more generically, if the sector be made of any material capable of absorbing X-rays and the absorption coefficient of the material and the thickness of the sector be known, then it is easy to calculate the percentage absorption for any other known thickness of the same material.

It follows as a corollary that for a given X-ray tube operating under given conditions, the homogeneity of the X-rays may be determined by exposing in succession a number of sectors 52 of different thicknesses and consequently of different absorptive capacity, and determining the percentage peculiar to each of the respective thicknesses. Supposing the several sectors just mentioned be arranged in such order of succession as to gradually increase in thickness, whenever the additional percentage increases for each successive thickness becomes uniform, this uniformity indicates that the radiation is now homogeneous for practical purposes in therapy. My instrument, therefore, serves for the purpose of determining the degree of homogeneity and the absorption coefficient. From this date the penetrative power of the X-rays and their other physical constants may be calculated.

As is well known in this art, the various instruments and methods of estimating the dosage of X-rays are known to be more sensitive in certain parts of the X-ray spectrum than in other parts thereof. Thus, a photographic plate is more sensitive to rays in which the wave length is long than in which it is short. On this account, penetrometers are inherently inaccurate if dependent upon exposures of, or upon records obtained upon, different photographic materials, because in such devices rays of different waves length can not be brought into comparison. With my device, however, the exposures are made on a single plate and with a single type of radiation, and then the plate is developed so that the respective fields of exposure are obtained under exactly the same general experimental conditions. The result is that the records obtained are independent of the individual properties of the photographic material used for recording the respective densities of the X-rays.

The operation of my device may be readily understood from the foregoing description.

The parts being assembled and arranged, the photographic plate being in position and the sector or sectors of aluminum or any other substance properly arranged, a record is made on the photographic plate as above described and as indicated in Figure 6. From this record the reading is made, as above described.

I do not limit myself to the precise method and apparatus here shown and described, the scope of my invention being commensurate with my claims.

While in the claims I mention a photo plate, I use this term in a broad sense, meaning thereby any reasonable equivalent for a photo plate, such for instance as a photo film or the like.

Having thus described my invention, what I claim as new and desire to secure by Letters Patent is as follows:

1. The method, herein described, of determining the penetration of X-rays of substantially uniform intensity from a given source, which consists in causing X-rays from said source to fall upon a photo plate having two fields of exposure so located that they may be readily compared, the time of exposure of one of said fields being uniform throughout the field and the time of exposure of the other of said fields being varied throughout the field by a known ratio as compared with the time of exposure of the field which is exposed uniformly, one portion of said field in which the time of exposure is thus varied being exposed for the same length of time as said field throughout which the time of exposure is uniform, and another portion of the same field in which the time of exposure is varied to a time period so short as to be negligible, intercepting a portion of the X-rays which would otherwise reach the field in which the times of exposure is uniform, so that the mean intensity of the X-rays reaching the last-mentioned field is reduced, then developing said photo plate so as to form thereupon two photo records corresponding to the two fields of exposure, and finally comparing said photo records, and therefrom determining the percentage of rays absorbed.

2. In a penetrometer for determining the quality of X-rays from any source when of substantially uniform intensity, the combination of a photo plate sensitive to said X-rays, means for so exposing a predetermined area of said plate to the action of the X-rays that the time of exposure of said area is uniform throughout the said area, mechanism for so exposing another predetermined area of said photo plate that the time of exposure is varied gradually throughout said last-mentioned area, from a maximum period equal to the period of exposure of the said area in which the time of exposure is uniform to a minimum period in which the time of exposure is negligible, so that the time of exposure of the area exposed uniformly is equal to the time of exposure of one boundary of the other area, the period of exposure of the opposite boundary thereof being negligible, and an X-ray screen of known thickness and density for covering the said area in which the period of exposure is uniform, in order to absorb some of the X-rays that would otherwise reach said last-mentioned area, so that the subsequent development of the photo plate will produce a photographic record by aid whereof the relative intensity of the X-rays before they pass through the said X-ray screen is determined.

3. In a penetrometer for X-rays of substantially uniform intensity, the combination of a photo plate sensitive to said X-rays, means for so exposing a definite area of said plate to the action of X-rays that the time of exposure of said area is uniform throughout said area, mechanism for so exposing another definite area of said plate that the time of exposure thereof is varied gradually throughout the last-mentioned area, from a maximum period equal to the period of exposure of the area in which the time of exposure is uniform to a minimum period in which the time exposure is negligible, an X-ray screen of a given density for intercepting a portion of the X-rays otherwise reaching the uniformly exposed area and means for enabling the operator, by comparing the tints made by the respective areas, to determine the intensity of the X-rays after passing through the screen as compared with the initial intensity of the X-rays.

4. In a penetrometer for X-rays the combination of a photo plate sensitive to said X-rays, a base substantially opaque to X-rays and provided with an opening for X-rays to pass through, a disk opaque to X-rays and revolubly mounted upon said base, said disk being partially cut away and serving as a revoluble shutter for alternately intercepting X-rays and allowing them to pass through said opening, so that the rays thus passing are of substantially uniform intensity throughout the area of exposure thus controlled by said shutter, a second disk partially cut away and mounted adjacent said first mentioned disk, said second mentioned disk having edges so located and arranged that they may be brought into and out of registry with the edges of said first-mentioned disk in order to control the intensity X-rays passing through the opening in said base and under the joint control of the two disks, and mechanism for driving said disks so that the number of revolutions made by said first mentioned disk per unit of time is double the number of revolutions of said second mentioned disk.

5. In a penetrometer for X-rays the combination of a source of X-rays of substantially uniform intensity, a photo plate sensitive to X-rays, a base substantially opaque to X-rays and provided with an opening adapted for X-rays to pass therethrough, a disk revolubly mounted upon said base and partially cut away and thus provided with edge portions which can be brought into and out of registry with the edges of said base as bounding the opening therein, a second disk having a greater diameter than said first mentioned disk and partially cut away, said last-mentioned disk being thus provided with edges which can be brought into and out of registry with the aforesaid edges of said first mentioned disk and the aforesaid edges of said base as bounding said opening therein, gearing connecting said disks and so arranged as to drive said first mentioned disk at double the number of revolutions of said second mentioned disk per unit of time, and means for actuating said gearing and thus driving said disks.

6. In an X-ray penetrometer the combination of a source of X-rays of substantially uniform intensity, a base opaque to X-rays and adapted to be brought into operative relation with a photo plate sensitive to X-rays, said base being provided with edge portions and so formed as to permit the passage of X-rays to an extent permitted by the form of the base and limited by the position of said edge portions, a shutter movably mounted upon said base and so formed as to alternately allow X-rays to pass the edges of the edge portion of said base and to intercept their passage, in order to modify the effect of the X-rays upon a portion of said photo plate, a second shutter movably mounted upon said base and co-acting with said first-mentioned shutter for controlling the effect of X-rays upon another portion of said photo plate, and mechanism for turning said disks at different rates of speed.

7. In a penetrometer for X-rays the combination of a source of X-rays of substantially uniform intensity, a photo plate sensitive to said X-rays, a base substantially opaque to X-rays and provided with an opening for X-rays to pass through, a face plate of material relatively transparent to X-rays and made thin to facilitate their passage therethrough, said face plate being provided with means for facilitating the formation of a photo scale upon said sensitive plate, and a pair of revoluble shutters mounted upon said base and each so proportioned and arranged as to alternately cover and uncover said opening in said base.

8. In a penetrometer for X-rays the combination of a source of X-rays of substantially uniform intensity, a photo plate sensitive to said X-rays, a base provided with a portion substantially opaque to X-rays and with an opening to facilitate passage of X-rays therethrough in order to make a photographic record upon said photo plate, revoluble shutters mounted upon said base, means for turning said shutters at different rates of speed so as to produce upon said sensitive plate a uniform field of exposure and a varied field of exposure, and an X-ray screen for intercepting some of the X-rays which would otherwise reach said uniform field of exposure.

9. In a penetrometer for X-rays the combination of a source of X-rays of substantially constant intensity, a photo plate sensitive to said X-rays, means for so exposing a predetermined area of said sensitive plate of said X-rays as to render uniform the intensity of all of the X-rays reaching said area, means for so exposing another predetermined area of said sensitive plate as to vary the intensity of the X-rays gradually from one boundary of said last-mentioned area to another boundary thereof, and an X-ray screen located between said source of X-rays and said sensitive plate, and so positioned as to intercept a portion of the X-rays which would otherwise reach the first mentioned area.

10. In a penetrometer for X-rays the combination of a source of X-rays of substantially uniform intensity, a photo plate sensitive to said X-rays, shutter mechanism disposed adjacent said source of X-rays and said photo plate for the purpose of exposing a predetermined area of said photo plate to the action of said X-rays and then stopping the passage of said X-rays, the said shutter mechanism being so proportioned and arranged as to render substantially equal the density of the X-rays in different portions of said predetermined area, mechanism for exposing another area of said photo plate to the action of said X-rays and then stopping passage of said X-rays, said last-mentioned mechanism being arranged to vary the mean density of the X-rays reaching said second mentioned area so that the maximum density of the X-rays reaching said last-mentioned area is equal to the mean density of the X-rays reaching said first-mentioned area and the minimum density of the X-ray is practically negligible, and an X-ray screen located between the source of X-rays and said second mentioned area for the purpose of intercepting some of the X-rays that would otherwise reach the latter.

WM. H. MEYER, M. D.